Aug. 1, 1967    R. R. SCHULTE    3,333,588

BRAIN VENTRICLE CANNULA

Filed July 6, 1964

INVENTOR.
RUDOLF R. SCHULTE
BY
Angus & Mon
ATTORNEYS.

United States Patent Office 3,333,588
Patented Aug. 1, 1967

3,333,588
BRAIN VENTRICLE CANNULA
Rudolf R. Schulte, 3328 Calle Fresno,
Santa Barbara, Calif. 93105
Filed July 6, 1964, Ser. No. 380,568
5 Claims. (Cl. 128—350)

This invention relates to a ventricular cannula.

Ventricular punctures for the purpose of determining the composition and characteristics of fluid in the ventricles of the brain are well known. Punctures for this purpose are ordinarily carried out with a metal cannula. However, it is found that the repeated ventricular punctures which are required in order to carry out procedures over extended periods of time with these cannulas create numerous problems. For example, they can be the cause of porencephalic dilations at the site of the puncture tracts. In certain cases, as in any posterior fossa operative or postoperative ventricular decompression, it would be advantageous to have a cannula available which could remain in place for an extended period of time without causing mechanical trauma to the brain tissue other than that required for a one-time insertion thereof. It is an object of this invention to provide such a cannula, which can be inserted with least trauma to the tissue, and there remain in place to form a readily available access to the ventricles.

The insertion of metal cannulas is not particularly difficult, the only care required being that it be inserted in the correct direction and to the proper depth. However, these rigid metal cannulas are intended to be left in place for only a relatively short period of time. A device intended to be left for a significant period of time ought to be flexible, and this raises the problem of how to insert the device. It is another object of this invention to provide a means for inserting a flexible cannula into the ventricle of the brain whereby a flexible cannula may be left in place over an extended period of time.

A cannula according to this invention comprises a flexible tube which is made of material which physically and chemically is compatible with the tissues of the brain. This tube has an axis and a closed first end. There is a closed circumferential wall and an open second end, and an axial passage connecting the two ends. A perforation extends through the tube adjacent to the first end and connects the passage with the outside of the tube. A disk is provided which is integral with the tube adjacent to the second end thereof, and this disk may readily be stabilized in place, for example by suturing, so that a dressing can be applied over the disk afterward, which dressing itself will cause no discomfort to the patient, and neither will the cannula. A plug seat is formed in the disk surrounding the axil passage adjacent to the second end and a plug is supplied which is adapted to seat upon and seal with the plug seat so as to close the passage.

According to a preferred but optional feature of this invention, the first end of the tube is made radiopaque, whereby to be rendered visible to X-rays when in the brain.

According to still another preferred but optional feature of this invention, an integral strap joins the plug and the disk so that they do not become separated.

The above and other features of this invention will be fully understood from the following detailed description and the accompanying drawings in which.

Figure 1:
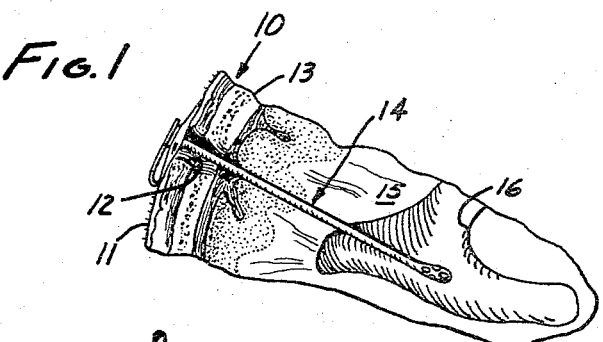
FIG. 1 is a plan view partly in cutaway cross-section showing a device, according to the invention, installed in the brain.

FIG. 1 includes a fragmentary cross-section of a human head 10 wherein the scalp 11 has been parted, and a burr hole 12 drilled through the bony structure of the skull 13. Cannula 14 has been installed in the brain 15 with its first end standing in the lateral ventricle 16. The lateral ventricle contains fluids to be investigated or treated.

Figure 2:
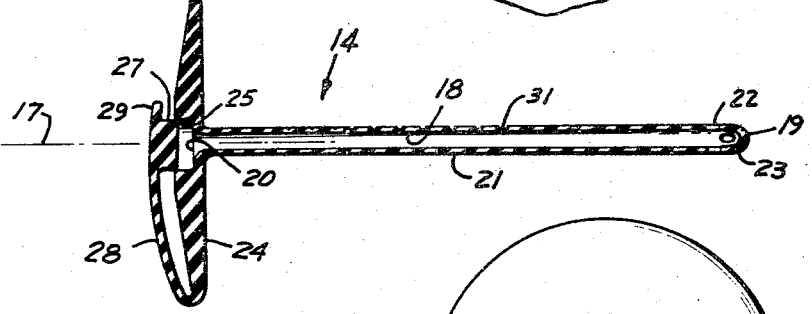
FIG. 2 is an axial cross-section of the device in FIG. 1.

As can best be seen in FIGS. 1 and 2, the cannula includes a tube which has a central axis 17 and a passage 18. The tube extends between a closed first end 19 and an open second end 20. The tube is bounded by an axial circumferential wall 21 which terminates at the two ends. Adjacent to the first end there is a plurality of perforations 22 which interconnect the passage with the outside of the tube.

Dots 23 represent radiopaque substances incorporated into the substance of which the tube is made, such as barium carbonate, gold, or other material opaque to X-rays. This region will be visible in X-ray illumination to show the ultimate position of the tip in the brain.

At the open second end of the tube there is a disk 24. It is integral with the tube. It has a flange so that it can be sutured or otherwise held in place. A dressing (not shown) can be applied over the disk, which dressing causes no discomfort.

A plug seat 25 is formed in the cannula structure adjacent to the second end of the tube. This may conveniently comprise a small sink which flares outwardly as it extends away from the second end of the axial passage.

Figure 3:
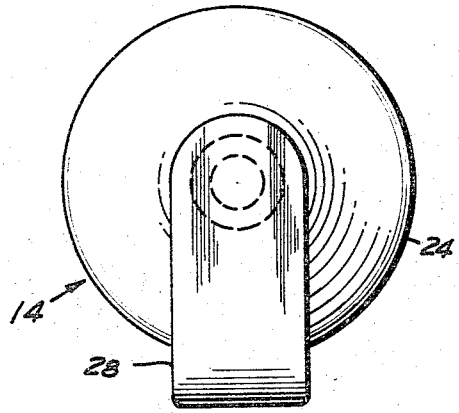
FIG. 3 is a left-hand end view of FIG. 2.
Figure 4:
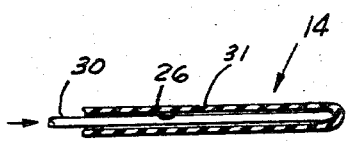
FIG. 4 is a fragmentary cross-section showing the insertion technique for the cannula of FIG. 1.

A plug 27 is adapted to close the passage at the plug seat. Plug 27 flares outwardly toward its end which is inserted first into the passage, so it snaps into the opening, and firmly engages the plug seat. As can best be seen in FIG. 3, the plug and plug seat are preferably made generally circular so as to form a good seal. The dimensions of the plug in its unflexed condition will preferably be larger, by a few thousandths of an inch, than the corresponding dimensions of the plug seat when the plug seat is in the unflexed condition, so that when the plug is forced into the plug seat, there will be a good fluid seal between the two.

A flexible strap 28 is integral with both the disk and the plug, and serves to connect the two so that they do no become separated. Strap 28 includes a flap 29 which can be grasped to pull the plug out of the seat.

It will be appreciated from FIG. 1 that once this cannula is installed, it may remain there for sensibly long periods of time without disturbing the brain and give fluid communication between the outside of the skull and the ventricle, which enables the nozzle of a standard syringe or intravenous tube to be connected thereto so that ventricular fluid can be taken out at any chosen time or other fluids can be introduced for various procedures, the plug keeping the system closed whenever desired.

The insertion of this cannula into the brain is quite simple. This includes the use of a stylet 30 which has smaller lateral dimensions than the inside of passage 26. The tube bears graduations 31 of length so that when the cannula is forced through the cortex, the thickness of the cortex can be measured.

The technique of insertion is to wet the cannula and the stylet in a normal saline and then insert the stylet into passage 26 with its end against the inside of the closed first end. Then using suitable guidance means, the stylet is pressed into the brain which presses the cannula ahead of it. When the tip of the cannula has reached the ventricle, the stylet may be withdrawn, and at the same time the cannula is further advanced until the disk rests at the skin level. This will move the first end of the tube into the ventricle by a distance depending upon the dimensions involved and the length of the tube, all of which will be quite closely known before the procedure is undertaken. Thereafter, the device may be used as aforesaid.

This invention provides a means for introducing a cannula into the brain where it remains available for use in procedures requiring fluid access to the ventricles, causing trauma only at the time of first insertion. In order that the device may remain in place for a sensible period of time, it is made of material which is physically and chemically compatible with the tissues of the brain. The presently preferred material is silicone rubber of the type sold by Dow-Corning Corporation as No. 372, formerly S–2000. This material has approximately the same hardness and resistance to flexure as normal human tissue, and does not react chemically with tissues of the brain. The tube preferably has an outer diameter of approximately .105 inch and a wall thickness of approximately .025 inch.

This invention is not to be limited by the embodiment shown in the drawings and described in the description which is given by way of example and not of limitation but only in accordance with the scope of the appended claims.

I claim:

1. A cannula for insertion into the ventricles of the brain, there to remain and provide for constant access without additional trauma, comprising: a flexible tube of sufficient length to extend from the scalp into a lateral ventricle of the brain and having a uniform inside and outside diameter in its relaxed condition and not adapted to be changed in either diameter when installed in situ, said tube being made of material physically and chemically compatible with the tissues of the brain, said tube having an axis, a closed first end, a closed circumferential wall, an open second end, an axial passage connecting the ends, and a perforation through the tube adjacent to the first end and connecting the passage with the outside of the tube; a disk integral with the tube adjacent to the second end thereof, which disk has a thickness greater than the wall thickness of the tube over a substantial area adjacent to its intersection with the tube, whereby to provide a substantial abutment means to limit the axial movement of the tube, said disk being adapted to bear and abut against the skin on the outside of the skull and to be retained thereto so as to define the axial position of the tube inside the skull; a recessed plug seat in the disk surrounding the axial passage adjacent to the second end said seat having a greater diameter than the inside diameter of the passage; and a plug flexibly connected to the disk and adapted to seat upon and seal with the plug seat so as to close the passage, said plug being removable to open the same.

2. A cannula according to claim 1 in which the first end of the tube is radiopaque whereby to be rendered visible to X-rays when in the brain.

3. A cannula according to claim 1 in which the entire device is made of silicone rubber.

4. A cannula according to claim 1 in which an integral flexible strap joins the plug and the disk.

5. A cannula according to claim 4 in which the entire device is made of silicone rubber.

References Cited

UNITED STATES PATENTS

| | | | |
|---|---|---|---|
| 3,016,899 | 1/1962 | Stenvall | 128—348 |
| 3,058,472 | 10/1962 | Thornton | 128—348 |
| 3,071,139 | 1/1963 | Nicholson | 128—350 |
| 3,086,525 | 4/1963 | Whitcomb | 128—348 X |
| 3,111,125 | 11/1963 | Schulte | 128—350 |
| 3,128,769 | 4/1964 | Scislowicz | 128—348 |

RICHARD A. GAUDET, *Primary Examiner.*

DALTON L. TRULUCK, *Examiner.*